United States Patent [19]

Robinson et al.

[11] Patent Number: 4,788,877
[45] Date of Patent: Dec. 6, 1988

[54] COMPOSITE HOUSING FOR RACK AND PINION POWER STEERING GEAR

[75] Inventors: John H. Robinson; Donald R. Burnham, both of Saginaw, Mich.

[73] Assignee: General Motors Corporation, Detroit, Mich.

[21] Appl. No.: 23,784

[22] Filed: Mar. 9, 1987

[51] Int. Cl.[4] .................. B62D 5/08; B62D 53/06; F16B 11/00

[52] U.S. Cl. .................... 74/388 PS; 29/525; 74/422; 74/498; 91/375 A; 180/148; 277/72 FM; 403/267

[58] Field of Search .................. 74/388 PS, 422, 498; 91/375 A; 29/525; 180/148; 277/1, 72 FM; 403/267, 268

[56] References Cited

U.S. PATENT DOCUMENTS

| | | | |
|---|---|---|---|
| 1,285,430 | 11/1918 | Sheppy | 277/1 X |
| 3,788,159 | 1/1974 | Plant, II | 74/422 |
| 4,213,660 | 7/1980 | Yasui et al. | 29/525 X |
| 4,257,313 | 3/1981 | Sheppard | 91/422 |
| 4,452,274 | 6/1984 | Haga et al. | 137/625.22 |
| 4,454,801 | 6/1984 | Spann | 91/375 A |
| 4,465,101 | 8/1984 | Hasegawa | 137/625.68 |
| 4,483,237 | 11/1984 | Elser | 91/368 |
| 4,535,798 | 8/1985 | Sano | 137/625.21 |

Primary Examiner—Allan D. Herrmann
Attorney, Agent, or Firm—Saul Schwartz

[57] ABSTRACT

A composite housing for a rotary valve rack and pinion power steering gear includes a pinion housing portion fabricated of a light weight first metal and valve housing portion fabricated of a more dense and abrasion resistant second metal. The pinion housing portion includes a main body having a pinion bore therein. The valve housing portion is a right circular cylinder with an annular neck thereon. The annular neck is press fitted into a counterbore around the pinion bore whereby the valve housing portion is connected to the pinion housing portion. The pinion housing portion has an annular groove in an inside surface of the counterbore and a plurality of molding passages connected to the groove. The neck of the valve housing portion has an annular groove which cooperates with the groove in the counterbore in defining an annular ring chamber. Curable plastic is injection molded into the ring chamber and, when cured, defines a retaining ring providing a redundant connection between the valve housing portion and the pinion housing portion of the composite housing.

1 Claim, 1 Drawing Sheet

COMPOSITE HOUSING FOR RACK AND PINION POWER STEERING GEAR

BACKGROUND OF THE INVENTION

1. Field of the Invention

This invention relates generally to automotive rack and pinion power steering gears and, more particularly, to outer housings for such gears.

2. Description of the Prior Art

U.S. Pat. No. 4,454,801, issued June 19, 1984 to Chris R. Spann and assigned to the assignee of this invention, describes a rotary valve rack and pinion power steering gear having a single or one-piece die cast aluminum outer housing which supports the pinion shaft and the rotary valve. One piece die cast outer housings are attractive for minimizing weight and maximizing manufacturing efficiency. However, for maximizing resistance to abrasion by internal moving parts, such as elements of the rotary valve, and for minimizing potential wall porosity around the rotary valve, the portion of the housing around the rotary valve is desirably fabricated from a more dense and abrasion resistant material such as ferrous metal. To that end, rotary valve rack and pinion power steering gears have been proposed which include separate, bolted-together pinion and valve housings. A composite housing and method of assembling the same according to this invention represents an improvement over such bolted-together housings.

SUMMARY OF THE INVENTION

This invention is a new and improved composite housing for a rotary valve rack and pinion power steering gear. The new and improved composite housing includes a pinion housing portion fabricated from a light weight first material such as aluminum and a valve housing portion fabricated from a second more dense and abrasion resistant material such as ferrous metal, the pinion and valve housing portions being rigidly connected without bolts through an interference press fit which is sealed and redundantly protected against failure by an in situ injection molded plastic retaining ring. The pinion housing portion includes a pinion bore aligned on an axis of the housing and a cylindrical counterbore around the pinion bore in an end surface of the housing. The valve housing portion is a right circular cylinder having a neck at one end which is pressed into the counterbore to rigidly and nonrotatably connect the valve housing portion to the pinion housing portion. Injection molding passages in the pinion housing portion connect to a first annular groove in the inner cylindrical surface of the counterbore. An annular groove in the facing surface of the neck of the valve housing portion overlaps the annular groove in the pinion housing portion and cooperates therewith in defining an annular ring chamber. Curable plastic is injected into the ring chamber through the molding passages and, when cured, operates as a retaining ring and seal which redundantly prevents separation of the valve housing portion from the pinion housing portion and which inhibits migration of moisture and contamination into the interior of the steering gear. An inner cylindrical surface on the neck of the valve housing portion supports a sleeve bearing which provides intermediate support for the pinion shaft.

BRIEF DESCRIPTION OF THE DRAWINGS

Referring now to FIG. 1 of the drawings, a rotary valve, automotive rack and pinion power steering gear 10 is illustrated and described herein only as necessary to establish the environment of the composite housing according to this invention. The steering gear 10 is described in detail in the aforesaid U.S. Pat. No. 4,454,801.

Referring to FIG. 1, the steering gear 10 includes a power cylinder 12 and a composite housing 14 according to this invention. The power cylinder 12 is part of the power assist fluid motor of the steering gear. The fluid motor further includes a piston 16 slidable in the cylinder and a piston rod 18 rigidly connected to the piston. The piston 16 divides the internal volume of the power cylinder 12 into a pair of variable volume working chambers 20 and 22. The power cylinder is rigidly attached to the left end of a tubular rack guide section 24 of a pinion housing portion 26 of the composite housing 14. The pinion housing portion is fabricated of a lightweight, easily die cast material such as aluminum. The right end of the piston rod 18 is rigidly connected to the left end, not shown, of a steering rack 28 having and array of rack teeth 30 thereon. The steering rack is supported in the rack guide section for translation in the length direction of the rack guide section.

Figure 1:
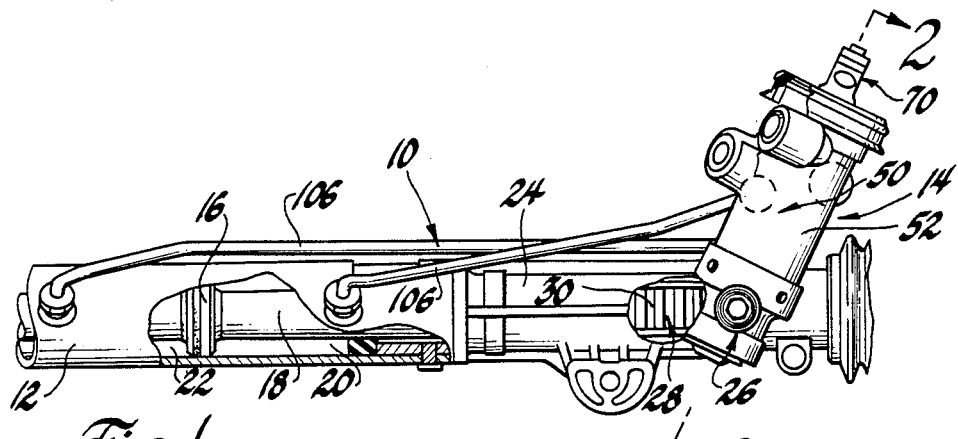
FIG. 1 is a partially broken away perspective view of a rotary valve rack and pinion power steering gear having a composite housing according to this invention.
Figure 2:
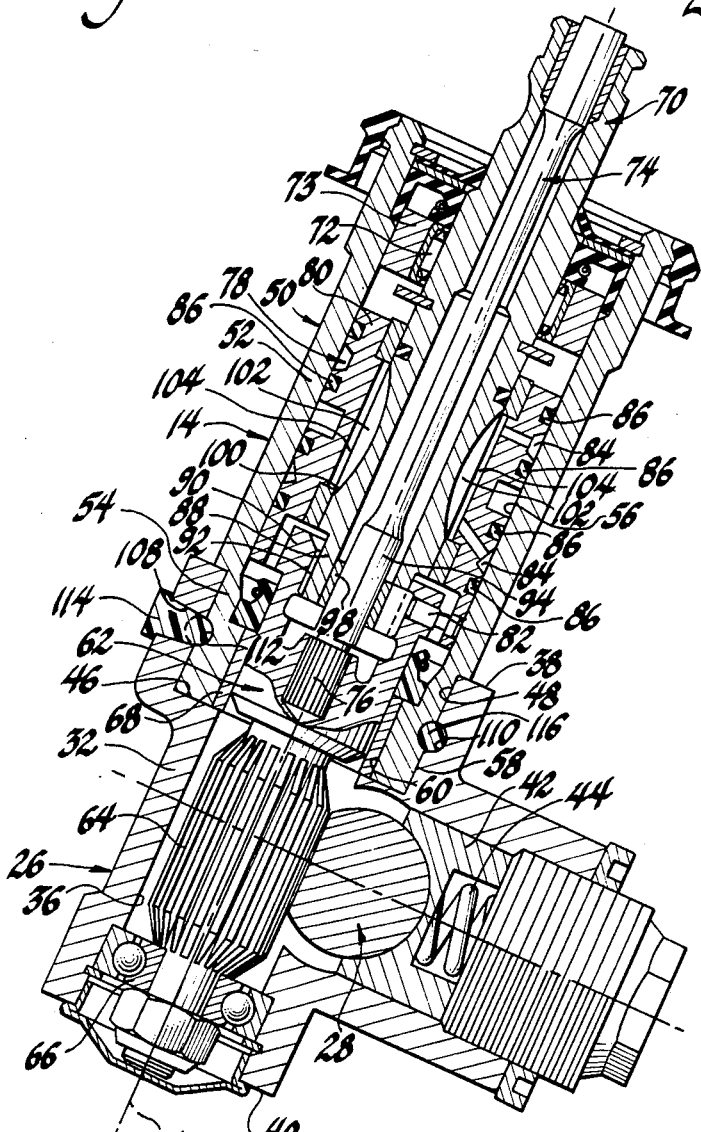
FIG. 2 is an enlarged sectional view taken generally along the plane indicated by lines 2—2 in FIG. 1.

As seen best in FIGS. 1 and 2, the rack guide section 24 is an integral extension of the pinion housing portion 26 which further includes a main body 32 defining a pinion axis 34. The main body 32 has a pinion bore 36 therein aligned on the axis 34. The pinion bore extends between an upper end surface 38 of the main body 32 and a lower end surface 40 thereof. The steering rack 28 crosses and partially overlaps the pinion bore 36. An adjusting plug 42 is slidably disposed in an appropriate bore in the main body behind the steering rack and, under the urging of a spring 44, biases the steering rack toward the pinion bore 36. The main body 32 is enlarged adjacent the upper end surface 38 thereof to provide sufficient material for a cylindrical counterbore 46 in the end surface 38 around the pinion bore. The counterbore 46 defines an inner cylindrical surface 48 aligned on the axis 34.

The composite housing 14 further includes a rotary valve housing portion 50. The valve housing portion 50 is fabricated as a right circular cylinder from a more dense and abrasion resistant material, such as ferrous metal, than the material of the pinion housing portion 26. The valve housing portion 50 has a cylindrical wall 52 which terminates at one end in an annular neck 54. The wall 52 has a machined inner surface 56. The neck 54 has a machined outer surface 58 and a concentric machined inner surface 60. The valve housing portion 50 is aligned on the axis 34 and the neck 54 is press fitted into the counterbore 46 until a shoulder on the valve housing portion 50 at the end of the neck 54 abuts the end surface 38 on the pinion housing portion 26. The diameter of the outer surface 58 exceeds the diameter of the inner surface 48 of the counterbore 46 by a predetermined amount sufficient to insure maintenance of an interference fit between the two housing portions at all anticipated operating temperatures of the steering gear 10.

A pinion shaft 62, having a plurality of pinion gear teeth 64 thereon, is supported on both the pinion and the valve housing portions 26 and 50, respectively, for rotation about the axis 34. The pinion gear teeth 64 mesh with the rack teeth 30 on the steering rack 28. The pinion shaft 62 is supported at one end on the pinion housing portion 26 by a ball bearing 66 and at the other end on the valve housing portion 50 by a sleeve bearing 68 on the inner surface 60 of the neck 54.

A stub shaft 70 is aligned on the pinion axis 34 and is supported on the valve housing portion 50 for rotation about the pinion axis by a bearing 72 on a ring 73 seated against the inner surface 56 of the wall 52. A torsion rod 74 is disposed within the stub shaft and has one end rigidly connected to the stub shaft outside the valve housing portion and the other end spline connected to the pinion shaft 62 at 76.

A rotary valve 78 is disposed in the valve housing portion 50 and includes a valve sleeve 80 rotatable about the axis 34 relative to the inner cylindrical surface 56 of the valve housing portion. The valve sleeve 80 is connected to the pinion shaft 62 through a radial pin 82, FIG. 2, whereby the valve sleeve rotates as a unit with the pinion shaft. The valve sleeve 80 has a plurality of outer grooves 84 facing the inner cylindrical surface 56. The grooves 84 are flanked by a corresponding plurality of seal rings 86 disposed in appropriate grooves in the valve sleeve and slidably engaging the inner cylindrical surface 56 of the valve housing portion.

As seen best in FIG. 2, an innermost end 88 of the stub shaft 70 within the valve housing portion projects into an annular flange 90 on the adjoining end of the pinion shaft 62. A lost motion connection 92 is established between the innermost end 88 and the flange 90 which permits limited rotation of the stub shaft relative to the pinion shaft but connects the two in the event that relative rotation exceeds a predetermined included angle. In addition, the innermost end 88 of the stub shaft is rotatably journaled on a cylindrical end 94 of the torsion rod 74 within the stub shaft through a sleeve bearing 98.

An outer surface 100 of the stub shaft 70 within the valve housing portion operates as the spool of the rotary valve 78 and to that end has a plurality of axially extending grooves 102 therein which cooperate with a corresponding plurality of internal grooves 104 in the sleeve to pressurize and exhaust the working chambers 20 and 22 of the fluid motor through a pair of conduits 106, FIG. 1, which extend between the power cylinder 12 and appropriate fittings, not shown, on the valve housing portion 50. The dense and abrasion resistant material from which the valve housing portion 50 is fabricated resists abrasion by the valve sleeve 80 and the seal rings 86 and has superior porosity characteristics which render the valve housing portion virtually impermeable to the pressurized fluid around the rotary valve 78 throughout the service life of the steering gear 10.

As seen best in FIG. 2, the main body 32 of the pinion housing portion 26 has a plurality of radially extending injection molding passages therein, only a single passage 108 being illustrated in FIG. 2, which passages communicate with a first annular groove 110 in the inner cylindrical surface 48 of the counterbore 46. A second annular groove 112 in the outer cylindrical surface 58 on the neck 54 of the valve housing portion faces and overlaps the first annular groove 110. The first and second annular grooves 110 and 112 cooperate to form a hollow annular ring chamber. A quantity of curable plastic material 114, such as nylon, is injected under pressure into the molding passages 108 and into the ring chamber which material, after curing, forms a retaining ring 116 between the pinion housing portion 26 and the valve housing portion 50. The retaining ring 116 operates as a back-up for the interference fit between the pinion housing portion and the valve housing portion to prevent relative separation between the two. In addition, because the injected material is forced into intimate contact with all surfaces defining the ring chamber, the retaining ring also operates as a moisture and contamination inhibiting seal at the interface between the inner cylindrical surface 48 of the counterbore 46 on the pinion housing portion 26 and the outer cylindrical surface 58 on the neck 54 of the valve housing portion 50. Finally, because the injected material interlocks with the surface irregularities in the groove 112 due to shrinkage during cure, the retaining ring 116 functions as a redundant anti-rotation lock between the valve housing portion and the pinion housing portion.

The embodiments of the invention in which an exclusive property or privilege is claimed are defined as follows:

1. A composite housing for a rotary valve rack and pinion power steering gear comprising:
   a pinion housing portion fabricated from a light weight first metal,
   means on said pinion housing portion defining a pinion bore aligned on a pinion axis of said pinion housing portion,
   a right circular cylindrical valve housing portion fabricated from a second metal more dense and abrasion resistant than said first metal,
   means defining a counterbore in an end surface of said pinion housing portion around an end of said pinion bore having an inner cylindrical surface aligned on said pinion axis,
   means defining an injection molding passage in said pinion housing portion,
   means defining a first annular groove in said inner cylindrical surface of said counterbore connected to said injection molding passage,
   means defining an annular neck on said valve housing portion having an outer cylindrical surface,
   means on said valve housing portion defining a second annular groove in said outer cylindrical surface,
      said annular neck on said valve housing portion being received in said counterbore in said pinion housing portion with an interference press fit between said inner cylindrical surface and said outer cylindrical surface and with said first annular groove overlapping at least a portion of said second annular groove and cooperating therewith in defining an annular ring chamber,
   in situ injection molded retaining and seal means in said passage means and in said ring chamber forming a retaining ring redundantly inhibiting withdrawal of said valve housing portion from said pinion housing portion and sealing the interface between said inner and said outer cylindrical surfaces, and
   means on said annular neck defining an inner cylindrical surface aligned on said pinion axis when said annular neck is received in said counterbore,
   said inner cylindrical surface on said neck defining a bearing support for a pinion shaft of said rack and pinion steering gear in said pinion housing portion.

* * * * *